United States Patent
Sugimoto

(10) Patent No.: US 9,149,996 B2
(45) Date of Patent: Oct. 6, 2015

(54) STRIP, METHOD FOR MANUFACTURING THE SAME, AND METHOD FOR MANUFACTURING PNEUMATIC TIRE

(75) Inventor: Mutsuki Sugimoto, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 0 days.

(21) Appl. No.: 13/989,896

(22) PCT Filed: Jun. 17, 2011

(86) PCT No.: PCT/JP2011/063938
§ 371 (c)(1),
(2), (4) Date: May 28, 2013

(87) PCT Pub. No.: WO2012/077373
PCT Pub. Date: Jun. 14, 2012

(65) Prior Publication Data
US 2013/0248085 A1 Sep. 26, 2013

(30) Foreign Application Priority Data
Dec. 8, 2010 (JP) .................. 2010-273524

(51) Int. Cl.
*B32B 3/00* (2006.01)
*B32B 23/02* (2006.01)
(Continued)

(52) U.S. Cl.
CPC ............ *B29D 30/20* (2013.01); *B29D 30/1628* (2013.01); *B29D 30/3028* (2013.01);
(Continued)

(58) Field of Classification Search
CPC .............. B32B 3/02; B32B 3/14; B32B 3/18; B32B 25/08; B32B 25/18; B32B 27/302; B32B 2605/08; B60C 5/14; B60C 1/0008; B60C 2005/145; B60C 9/023; B29D 30/0681; B29D 2030/0682; B29D 30/16; B29D 30/20; B29D 30/3028; B29D 30/1628; Y10T 428/24777; Y10T 428/24752
USPC ........ 428/189, 192; 152/510; 156/110.1, 117, 156/123, 130, 130.5, 244.11
See application file for complete search history.

(56) References Cited

U.S. PATENT DOCUMENTS

| 5,660,656 A | 8/1997 | Herbelleauu et al. |
| 6,576,077 B1 | 6/2003 | Mitsuhashi et al. |

(Continued)

FOREIGN PATENT DOCUMENTS

| CN | 101511610 A | 8/2009 |
| CN | 101743135 A | 6/2010 |

(Continued)

OTHER PUBLICATIONS

Machine generated English language translation for JP 2002-96610 (original document dated Apr. 2002).*

(Continued)

*Primary Examiner* — Catherine A Simone
(74) *Attorney, Agent, or Firm* — Birch, Stewart, Kolasch & Birch, LLP

(57) ABSTRACT

The present invention relates to a ribbon-shaped strip used for an inner liner and a method for manufacturing the strip. The strip is to be wound on an outer circumferential surface of a tire molding drum or a core body to form an inner liner. The strip has an inner layer disposed inwardly in a tire and an outer layer disposed outwardly in the tire. The inner layer and the outer layer are bonded to each other with their ends offset by 0.5 mm to 30 mm in a widthwise direction. At least one layer of the inner layer is formed of an elastomer composition containing a styrene-isobutylene-styrene block copolymer. At least one layer of the outer layer is formed of a thermoplastic elastomer composition.

11 Claims, 8 Drawing Sheets

(51) Int. Cl.

| | |
|---|---|
| *B29D 30/00* | (2006.01) |
| *B29D 30/20* | (2006.01) |
| *B29D 30/16* | (2006.01) |
| *B29D 30/30* | (2006.01) |
| *B60C 1/00* | (2006.01) |
| *B32B 3/02* | (2006.01) |
| *B32B 25/08* | (2006.01) |
| *B32B 25/18* | (2006.01) |
| *B32B 27/30* | (2006.01) |
| *B32B 3/14* | (2006.01) |
| *B32B 3/18* | (2006.01) |
| B29D 30/06 | (2006.01) |
| B60C 9/02 | (2006.01) |

(52) U.S. Cl.
CPC .. *B32B 3/02* (2013.01); *B32B 3/14* (2013.01); *B32B 3/18* (2013.01); *B32B 25/08* (2013.01); *B32B 25/18* (2013.01); *B32B 27/302* (2013.01); *B60C 1/0008* (2013.04); *B29D 2030/0682* (2013.01); *B32B 2307/54* (2013.01); *B32B 2307/542* (2013.01); *B32B 2307/7242* (2013.01); *B32B 2605/08* (2013.01); *B60C 9/023* (2013.01); *B60C 2005/145* (2013.04); *Y10T 428/24752* (2015.01)

(56) References Cited

U.S. PATENT DOCUMENTS

| | | | |
|---|---|---|---|
| 8,201,603 B2 * | 6/2012 | Matsuda et al. ............... 152/510 |
| 8,646,500 B2 * | 2/2014 | Custodero et al. ............ 152/502 |
| 2004/0024126 A1 * | 2/2004 | Tsou et al. .................... 525/178 |
| 2006/0096690 A1 | 5/2006 | Nakata |
| 2006/0096696 A1 | 5/2006 | Oku et al. |
| 2007/0144658 A1 | 6/2007 | Miki et al. |
| 2008/0249236 A1 | 10/2008 | Nakashima et al. |
| 2009/0165914 A1 * | 7/2009 | Tomoi .......................... 152/510 |
| 2010/0126646 A1 | 5/2010 | Kudo et al. |
| 2010/0126647 A1 | 5/2010 | Hashimura et al. |
| 2010/0175804 A1 | 7/2010 | Lesage et al. |
| 2010/0294411 A1 | 11/2010 | Custodero et al. |
| 2011/0000603 A1 | 1/2011 | Hashimura et al. |
| 2012/0003413 A1 * | 1/2012 | Lesage et al. ................ 428/36.6 |

FOREIGN PATENT DOCUMENTS

| | | | |
|---|---|---|---|
| EP | 0 206 756 A2 | 12/1986 | |
| EP | 0 928 702 A1 | 7/1999 | |
| JP | 62-48704 A | 3/1987 | |
| JP | 64-62308 A | 3/1989 | |
| JP | 7-215007 A | 8/1995 | |
| JP | 11-254906 A | 9/1999 | |
| JP | 2000-79643 A | 3/2000 | |
| JP | 2000-254980 A | 9/2000 | |
| JP | 2002-96610 * | 4/2002 | ............. B60C 15/06 |
| JP | 2006-160236 A | 6/2006 | |
| JP | 2006-297733 A | 11/2006 | |
| JP | 2007-176088 A | 7/2007 | |
| JP | 2007-296916 A | 11/2007 | |
| JP | 2009-990 A | 1/2009 | |
| JP | 2009-513436 A | 4/2009 | |
| JP | 2010-100675 A | 5/2010 | |
| JP | 2010-528919 A | 8/2010 | |
| WO | WO 2005/033035 A1 | 4/2005 | |
| WO | WO 2007/013161 A1 | 2/2007 | |
| WO | WO 2007/050061 A1 | 5/2007 | |
| WO | WO 2008/029779 A1 | 3/2008 | |
| WO | WO 2008/029781 A1 | 3/2008 | |
| WO | WO 2008087776 A1 * | 7/2008 | |
| WO | WO 2008154996 A1 * | 12/2008 | |
| WO | WO 2010/063427 * | 6/2010 | ............. B32B 25/08 |

OTHER PUBLICATIONS

International Search Report issued in PCT/JP2011/063938, dated Sep. 13, 2011.
JP Office Action 2010-273524 dated May 8, 2012.
JP Office Action 2012-013251 dated Oct. 23, 2012.
Chinese Office Action for Application No. 201180059180.5 dated Feb. 28, 2015 with English language translation.

* cited by examiner (a)          (b)

(a)          (b)

STRIP, METHOD FOR MANUFACTURING THE SAME, AND METHOD FOR MANUFACTURING PNEUMATIC TIRE

TECHNICAL FIELD

The present invention relates to a strip for an inner liner used for a pneumatic tire, a method for manufacturing the strip, and a method for manufacturing a pneumatic tire including the strip.

BACKGROUND ART

In recent years, in response to strong social demands for low fuel consumption of vehicles, weight reduction of tires has been sought. Among tire members, weight reduction and the like of an inner liner also have begun. The inner liner is disposed inwardly in a tire, and has a function of reducing an amount of leakage of air (an amount of permeable air) from inside to outside of the pneumatic tire to improve air permeability resistance.

Currently, a rubber composition for such an inner liner employs, for example, a rubber blend mainly containing a butyl rubber. The rubber blend contains the butyl rubber by 70 mass % to 100 mass %, and a natural rubber by 30 mass % to 0 mass %. In this way, the tire is provided with improved air permeability resistance. In addition to butylene, the rubber blend mainly containing the butyl rubber contains isoprene by approximately 1 mass %, which acts with sulfur, vulcanization accelerator, and zinc white to achieve cross-linking between rubber molecules. In the case of normal blend, the above-described butyl-based rubber needs to have a thickness of 0.6 mm to 1.0 mm for a tire of a passenger car, and needs to have a thickness of approximately 1.0 mm to 2.0 mm for a tire of a truck/bus. In order to achieve weight reduction of such tires, use of polymer, which is more excellent in air permeability resistance than the butyl-based rubber and can provide an inner liner layer with a thinner thickness, has been requested.

Patent Literature 1 (Japanese Patent Laying-Open No. 7-215007) and Patent Literature 2 (Japanese Patent Laying-Open No. 11-254906) each propose a method for manufacturing a pneumatic tire including a core body having an outer circumferential surface resembling the inner surface shape of a tire when internal pressure is applied thereto in order to prevent uniformity of the tire from degrading. It is proposed that an unvulcanized tire is molded by sequentially applying an inner liner, a carcass ply, an unextended bead, a belt, a tread rubber, a side wall rubber, and the like to the outside of the core body. Then, the unvulcanized tire removed from the core body or the unvulcanized tire with the core body is input into a vulcanization press to be subjected to vulcanization, thereby improving uniformity of the tire.

In addition, in order to achieve weight reduction of a tire, it has been proposed to use a film made of a material including thermoplastic resin, instead of the above-described rubber composition. Thermoplastic resin has a smaller thickness than an inner liner of butyl rubber, achieving high air permeability resistance. A technique for winding an inner liner material obtained by extruding a strip of thermoplastic resin around a former has also been proposed. Here, when winding the strip, its portions overlap one another. A step difference will be generated at the overlapping portions, resulting in collections of air. The inner liner of thermoplastic resin having good air retainability cannot allow air in the collections of air to escape, with the result that a tire is manufactured while holding air even after vulcanization.

That is, air enters between the inner liner and the insulation or the carcass ply, thus resulting in a so-called "air-in phenomenon", in which a large number of small balloon-like collections of air appear. Such spots resulting from air-in appearing in the tire inside surface give a user an impression of bad appearance. In addition, during traveling, the air causes cracks in the inner liner. Accordingly, the internal pressure is decreased, with the result that the tire may burst in the worst case.

Meanwhile, during traveling with the tire, large shear strain acts on a vicinity of a shoulder portion in the inner liner. When the material including the thermoplastic resin is used as the inner liner, this shear strain is likely to cause detachment at an adhesion interface between the inner liner and the carcass ply, with the result that air leakage takes place from the tire, disadvantageously.

In Patent Literature 3 (International Publication WO2008/029781), a tire is manufactured using a strip of film layer stack in which a thermoplastic resin and a thermoplastic elastomer are blended. With the film layer stack, gas barrier property and adhesive property can be improved, whereby bonding can be achieved between the ribbon-shaped strips. However, with this technique, a step difference is generated by overlapping the strip on a smooth outer circumferential surface of a former. The step difference may result in collections of air, and may generate air-in in the tire inner appearance after vulcanization. In addition, the strip is difficult to be adhered to the outer circumferential surface of the core body, particularly, the side surface from the bead portion to the buttress portion, and may peel off the core body, so that molding would not be performed.

CITATION LIST

Patent Literature

PTL 1: Japanese Patent Laying-Open No. 7-215007
PTL 2: Japanese Patent Laying-Open No. 11-254906
PTL 3: International Publication WO2008/029781

SUMMARY OF INVENTION

Technical Problem

The present invention provides a ribbon-shaped strip used for an inner liner and a method for manufacturing the strip. A conventional strip has a flat rectangular cross sectional shape. Therefore, when winding the ribbon-shaped strip of predetermined width to produce a wider sheet, overlapping portions on the opposite ends of the strip are made thicker. Then, according to the present invention, a ribbon-shaped strip is formed by a layer stack obtained by bonding an inner layer and an outer layer with their opposite ends offset by a constant distance. By winding the strip on the outer circumferential surface of the core body such that opposite ends thereof fit together and molding an inner liner, the inner liner thus resembling the inner surface shape of a vulcanized tire can be molded. As a result, air-in in the tire is eliminated and adhesive property between the inner liner and the carcass ply is improved, while crack growth due to repeated flection deformation during traveling with the tire is reduced.

The strip of the present invention is formed by bonding an inner layer and an outer layer of specific materials of styrene-based thermoplastic elastomers. Thus, weight reduction is achieved and rolling resistance of a tire is reduced. Further, the inner liner can be prevented from breaking or deforming by heat and pressure of a bladder in a vulcanization step, thereby avoiding cracks in the inside surface and/or collections of air in the inside.

Solution to Problem

The present invention relates to a strip to be wound on an outer circumferential surface of one of a tire molding drum and a core body to form an inner liner. The strip has an inner layer disposed inwardly in a tire and an outer layer disposed outwardly in the tire, the inner layer and the outer layer being bonded to each other with their ends offset by 0.5 mm to 30 mm in a widthwise direction. At least one layer of the inner layer is formed of an elastomer composition containing a styrene-isobutylene-styrene block copolymer. At least one layer of the outer layer is formed of a thermoplastic elastomer composition.

Preferably, the strip has a width (W0) of 5 mm to 40 mm and a thickness (T0) of 0.02 mm to 1.0 mm. Further, preferably, the thermoplastic elastomer composition of the outer layer contains one of a styrene-isoprene-styrene block copolymer and a styrene-isobutylene block copolymer.

Another aspect of the present invention relates to a method for manufacturing the strip, including the steps of (a) extruding a thermoplastic elastomer by an extruder having an extruder main body and an extrusion head to form a sheet, (b) passing the sheet between a die roller and a nip roller to transfer a shape of the die roller on the sheet to mold the inner layer and the outer layer of design shape respectively, (c) detaching each of the inner layer and the outer layer from the die roller, and (d) bonding the inner layer and the outer layer with their ends in a longitudinal direction offset by 0.5 mm to 30 mm to form the strip.

Another aspect of the present invention relates to a method for manufacturing a pneumatic tire, wherein the strip is wound along a circumferential direction of a molding drum with side edges of the strip offset, thereby molding the inner liner.

Still another aspect of the present invention relates to a method for manufacturing a pneumatic tire, wherein the strip is wound along a circumferential direction of the core body with side edges of the strip offset, thereby molding the inner liner having a shape close to a finished sectional shape thereof.

Here, preferably, the core body has an outer circumferential surface resembling a tire inner surface shape when 5% of internal pressure is applied. Particularly preferably, the core body has an outer circumferential surface smaller than a tire inner surface shape when 5% of internal pressure is applied.

The method for manufacturing a pneumatic tire according to the present invention can include the step of forming an unvulcanized tire molded using the strip, on the outside of the core body, and the step of vulcanizing of inputting the unvulcanized tire having removed from the core body into a vulcanization mold for vulcanization molding.

In the step of vulcanizing, the unvulcanized tire is preferably vulcanized with 0.1% to 2.0% of a radius stretch by expansion of a bladder disposed on an inner side of the unvulcanized tire. In the step of vulcanizing, the unvulcanized tire is preferably vulcanized with 0.1% to 2.0% of a stretch in a radial direction by expansion of a bladder disposed on an inner side of the unvulcanized tire.

The method for manufacturing a pneumatic tire of the present invention includes the steps of molding an unvulcanized tire molded using the strip on the outside of the core body, and inputting the unvulcanized tire and the core body together into a vulcanization mold and heating the vulcanization mold and the core body, thereby vulcanizing the tire.

Advantageous Effects of Invention

According to the present invention, a strip formed of an inner layer and an outer layer of thermoplastic elastomer compositions is wound on the outer circumferential surface of a tire molding drum or a core body such that their opposite ends fit together, and an inner liner is molded. Therefore, a step difference between the fitting portions of the strip is reduced, and further, air-in can be eliminated. Moreover, adhesive property with an adjacent carcass ply can be improved, and flection crack growth of the inner liner can be reduced.

Since the inner liner is molded using the strip, the thickness thereof can be adjusted depending on the arrangement place in the tire. For example, merely a buttress portion can be made thick to improve gas barrier property and tire durability. Moreover, because the strip is of ribbon shape, it is applicable to tires of various sizes. Through the use of thermoplastic elastomers, the overall thickness can be made thin to achieve weight reduction while maintaining air shutoff property.

DESCRIPTION OF EMBODIMENTS

<Structure of Tire>

Figure 1:
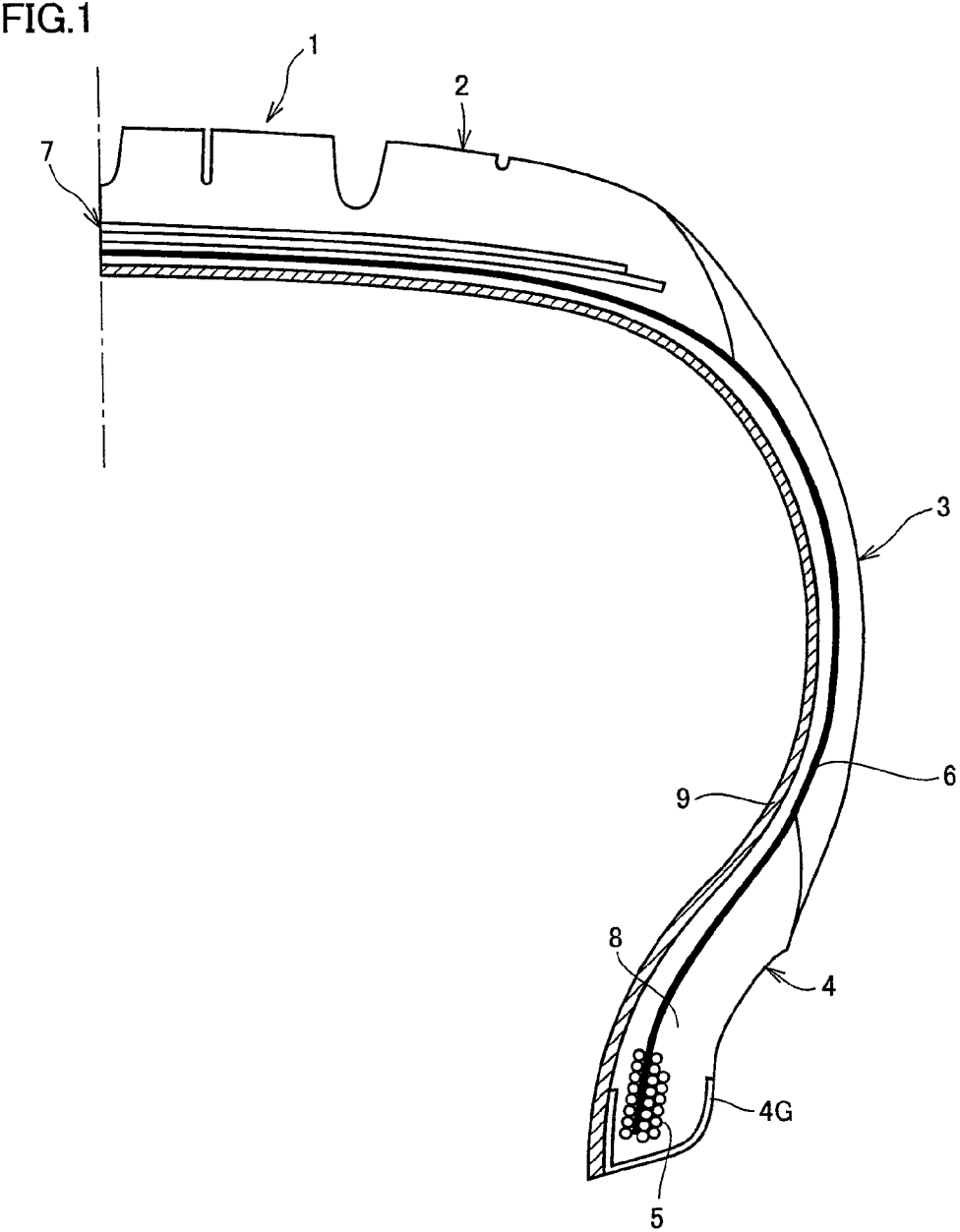
FIG. 1 is a schematic cross sectional view of the right half of a pneumatic tire of the present invention.

A pneumatic tire manufactured by the present invention will be described based on the drawings. FIG. 1 is a schematic cross sectional view of the right half of the pneumatic tire. In the figure, pneumatic tire 1 includes a tread portion 2, and a sidewall portion 3 and bead portions 4 so as to form a shape of toroid from the opposite ends of the tread portion. In each of bead portions 4, a bead core 5 is embedded. Further, a carcass ply 6 and a belt layer 7 are disposed. Carcass ply 6 is provided to extend from one bead portion 4 to the other bead portion, and ends in proximity to bead cores 5. Belt layer 7, which is formed of at least two plies, is disposed outside a crown portion of carcass ply 6.

Belt layer 7 is disposed such that two plies, which are formed of cords such as steel cords or aramid fibers, are arranged to allow the cords to cross each other between the plies normally at an angle of 5° to 30° relative to the tire circumferential direction. It should be noted that topping rubber layers can be provided on the outer sides of the ends of the belt layer to reduce detachment in the ends of the belt layer. Further, in the carcass ply, organic fiber cords such as polyester, nylon, or aramid are arranged at substantially 90° relative to the tire circumferential direction. A bead apex 8 is disposed to extend in the sidewall direction from the ends of the carcass ply and the vicinity of bead core 5. Further, an inner liner 9 is disposed inwardly relative to carcass ply 6 in the direction of the tire radius, so as to extend from one bead portion 4 to the other bead portion 4.

The present invention relates to a method for manufacturing a pneumatic tire including an inner liner disposed inwardly in the tire and a strip for molding the inner liner. The inner liner is manufactured by spirally winding a ribbon-shaped strip on an outer circumferential surface of a tire molding drum or a core body. The ribbon-shaped strip has its opposite ends offset such that a plurality of layers are stacked.

The strip is formed of a layer stack including an inner layer LB disposed on the molding drum or core body side and an outer layer LA disposed on the outside of the inner layer. The inner layer contains a styrene-isobutylene-styrene triblock copolymer (SIBS). Outer layer LA contains a thermoplastic elastomer, in particular, at least one of a styrene-isoprene-styrene triblock copolymer (SIS) and a styrene-isobutylene diblock copolymer (SIB). Outer layer LA is arranged to be in contact with a carcass ply or an insulation.

<Shape of Strip>

Figure 4:
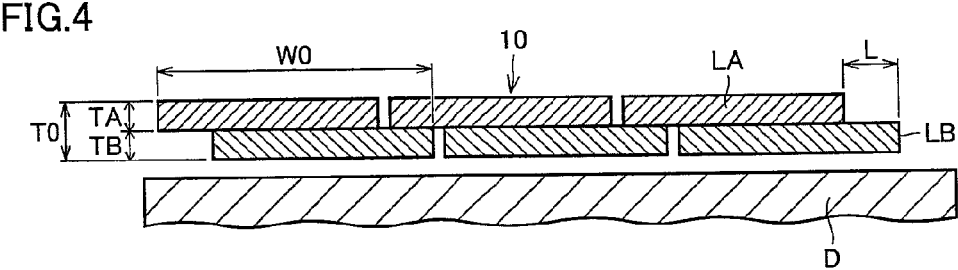
FIG. 4 is a schematic cross sectional view of a strip of the present invention.

Each of FIGS. 4 to 10 shows a cross sectional view of an embodiment of a strip 10. FIG. 4 shows a cross sectional view in the state where three portions of strip 10 are arranged in parallel on molding drum D. Strip 10 is formed of a layer stack including inner layer LB adjacent to the drum side and outer layer LA arranged on the outside of the inner layer. The both layers are arranged at an offset of a constant distance L in the widthwise direction. As a result, the strip as a whole has a section where inner layer LB and outer layer LA overlap each other (hereinafter also referred to as a "strip main body") and a section on the opposite ends thereof where the layers do not overlap each other (hereinafter also referred to as "ear portions").

According to the present invention, the strip has a width (W0) of 5 mm to 40 mm. If the width (W0) of the strip falls outside this range, when molding an inner liner using the strip, accuracy in contour shape of the inner liner may be deteriorated, and further, fitting accuracy on the opposite ends may be deteriorated.

The strip has a thickness (T0) adjusted to be in a range of 0.02 mm to 1.0 mm, preferably in a range of 0.1 mm to 0.5 mm. If the thickness (T0) is less than 0.02 mm, dimensional accuracy will be deteriorated when molding of the inner liner, and the number of times of winding needs to be increased. On the other hand, if the thickness (T0) exceeds 1.0 mm, the junctions of the strip will be distorted during winding of the strip, resulting in deteriorated accuracy in contour shape, increased weight of the tire, and deteriorated rolling resistance.

Next, the offset distance (L) between inner layer LB and outer layer LA of the strip is in a range of 0.5 mm to 30 mm, preferably in a range of 1 mm to 20 mm. If the offset distance (L) is less than 0.5 mm, the effect of smoothing out unevenness formed on the surface by winding on the drum will be small. On the other hand, if the offset distance (L) exceeds 30 mm, the thickness dimension of the cross section of the inner liner formed by bonding the strip may become uneven.

Inner layer LB functions as a gas barrier layer, and has a thickness (TB) preferably adjusted to be in a range of 0.01 mm to 0.6 mm. If the thickness of the inner layer is less than 0.01 mm, extrusion molding will be difficult, and the number of times will be increased unnecessarily in order to form an inner liner of predetermined thickness. Further, the inner layer may be broken due to pressing pressure when vulcanizing a raw tire, with the result that an air leakage phenomenon may take place in the resulting tire.

On the other hand, if the thickness of the inner layer exceeds 0.6 mm, a thick part will be formed at the junctions on the opposite edges of the strip. Accuracy in contour shape will be deteriorated, flection durability of the inner liner will be decreased and weight reduction can no longer be expected. The thickness (TB) of inner layer LB preferably ranges from 0.05 mm to 0.5 mm. Here, inner layer LB can be formed of a single layer or a layer stack of multiple layers.

Outer layer LA functions as an adhesion layer that strengthens adhesive property with an adjacent rubber component, for example, a carcass ply, and has a thickness (TA) adjusted to be in a range of 0.01 mm to 0.4 mm. The thickness (TA) of outer layer LA refers to the thickness of a first layer if outer layer LA is composed only of the first layer, and refers to the thickness of a plurality of layers if outer layer LA is composed of the plurality of layers. If the thickness of outer layer LA is less than 0.01 mm, outer layer LA may be broken due to pressing pressure when vulcanizing the raw tire in which a strip of a layer stack is applied to the inner liner, with the result that vulcanization adhesion strength may be decreased. On the other hand, if the thickness of outer layer LA exceeds 0.4 mm, the weight of the tire is increased to possibly result in decreased performance in fuel efficiency. Outer layer LA preferably has a thickness of 0.03 mm to 0.3 mm.

Figure 5:
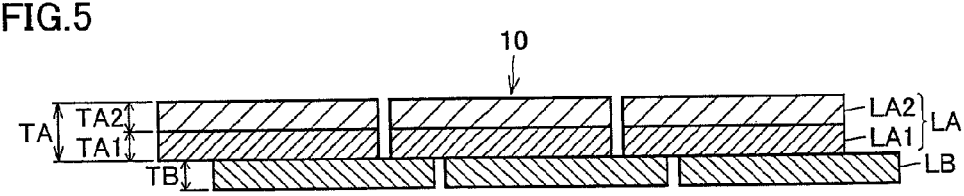
FIG. 5 is a schematic cross sectional view of a strip of the present invention.
Figure 6:
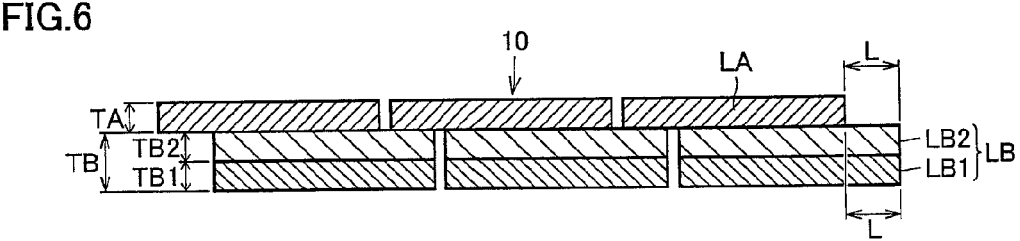
FIG. 6 is a schematic cross sectional view of a strip of the present invention.
Figure 7:
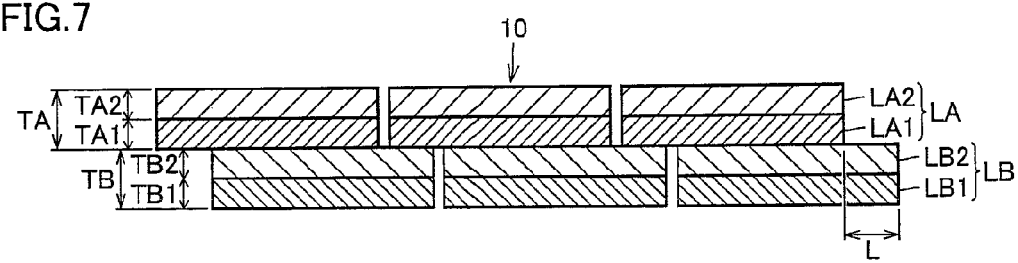
FIG. 7 is a schematic cross sectional view of a strip of the present invention.

The shape of the strip of the present invention will be described based on FIGS. 4 to 10. FIG. 4 shows a strip formed of a layer stack of one inner layer LB and one outer layer LA on the outer surface of molding drum D. FIG. 5 shows a strip formed of a layer stack of one inner layer LB and two outer layers LA1, LA2. FIG. 6 shows a strip formed of a layer stack of two inner layers LB1, LB2 and one outer layer LA. FIG. 7 shows a strip formed of a layer stack of two inner layers LB1, LB2 and two outer layers LA1, LA2.

Figure 8:
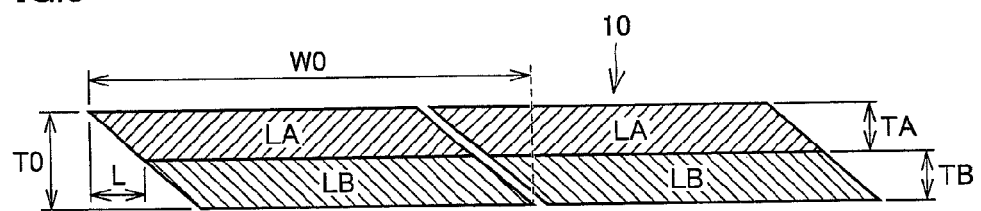
FIG. 8 is a schematic cross sectional view of a strip of the present invention.
Figure 9:
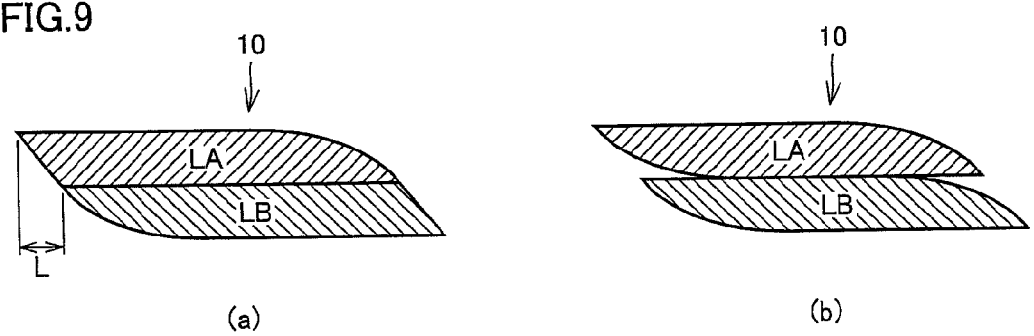
FIG. 9 is a schematic cross sectional view of strips of the present invention.
Figure 10:
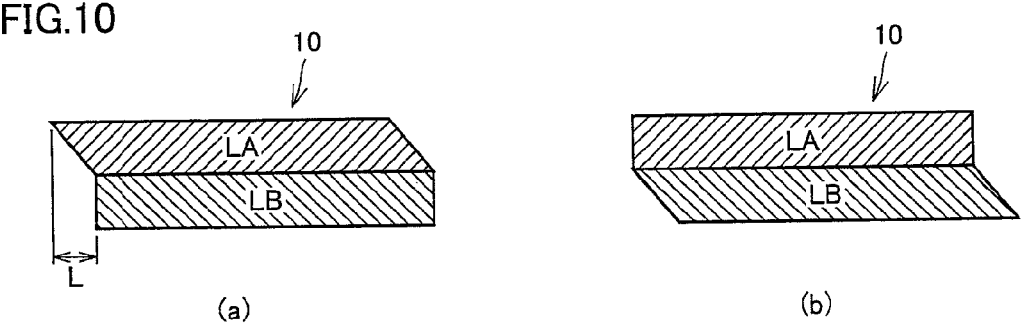
FIG. 10 is a schematic cross sectional view of strips of the present invention.

FIG. 8 shows a strip formed of a layer stack of one inner layer LB and one outer layer LA, the layers having a rhombic sectional shape. Each of FIGS. 9 (a) and (b) shows a strip formed of a layer stack of one inner layer LB and one outer layer LA, the layers having a sectional shape close to ellipse. FIG. 10 (a) shows a strip formed of a layer stack of inner layer LB having a rectangular sectional shape and outer layer LA having a rhombic sectional shape. FIG. 10 (b) shows a strip formed of a layer stack of inner layer LB having a rhombic sectional shape and outer layer LA having a rectangular sectional shape. In these strips, the length of an inclined portion in cross section is defined as the offset distance (L).

By forming the strip of the present invention into any of the above-described shapes, the opposite ends (ear portions) of the strip adjacent to each other when winding the strip on the drum to form an inner liner fit appropriately, so that junctions of even thickness can be formed and unevenness in step difference in thickness at the junctions is reduced.

<Method for Manufacturing Strip>

Figure 2:
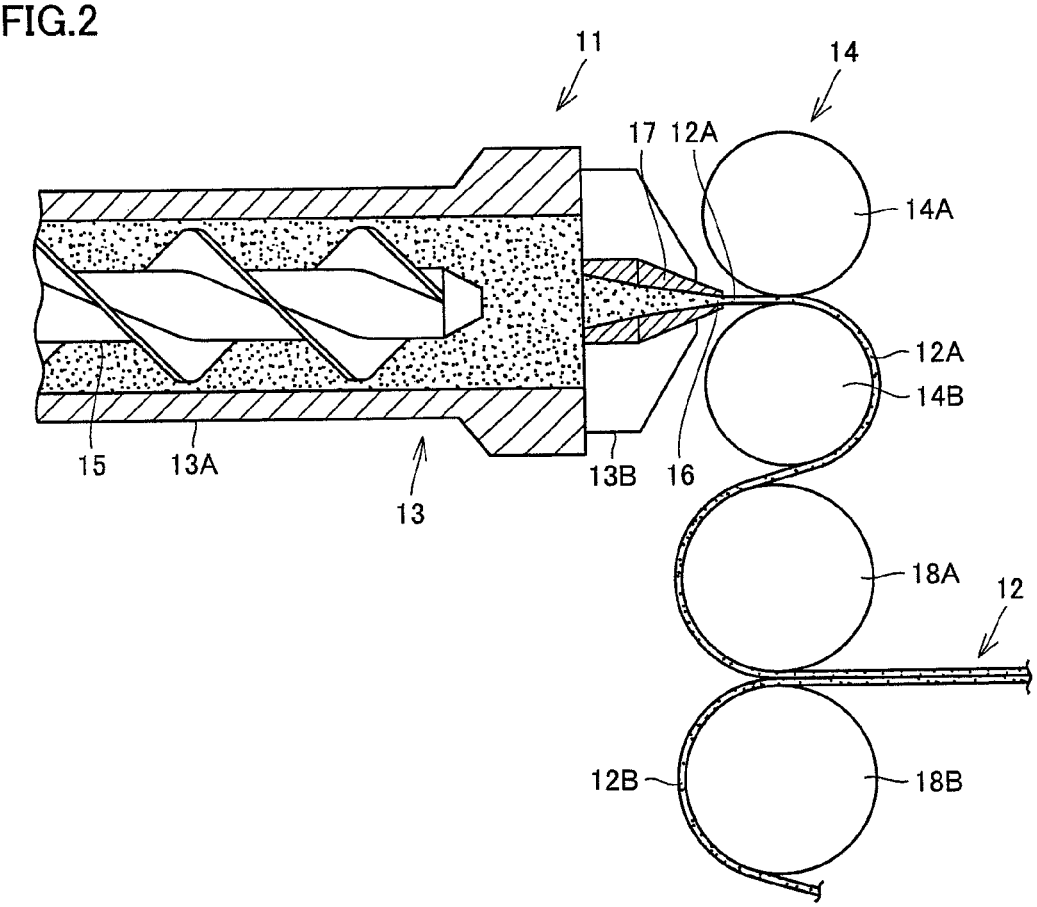
FIG. 2 is a schematic view of a device manufacturing a strip of the present invention.

A method for manufacturing strip 10 will be described with reference to FIG. 2. A strip manufacturing device 11 is composed of an extruder 13 for extrusion molding of a thermoplastic elastomer sheet 12A having a horizontally-long rectangular cross section and a nip roller 14A and a die roller 14B arranged in the vicinity of an extrusion port 16. Extruder 13 includes an extruder main body 13A having a screw shaft 15 and an extrusion head 13B forming a sheet of a thermoplastic elastomer discharged from this extruder main body 13A to extrude the sheet through extrusion port 16. Extruder main body 13A kneads and melts the input thermoplastic elastomer with screw shaft 15 driven by a motor having a slowdown function. Extrusion head 13B has a mouthpiece 17 for extrusion molding attached to the leading end of extruder main body 13A to constitute extrusion port 16.

Nip roller 14A and die roller 14B constitute a pair of upper and lower rollers, and are held in the transverse direction orthogonal to the direction of extrusion through extrusion port 16. Nip roller 14A and die roller 14B are rotatably drive controlled at the same speed and in synchronization with each other.

Figure 3:
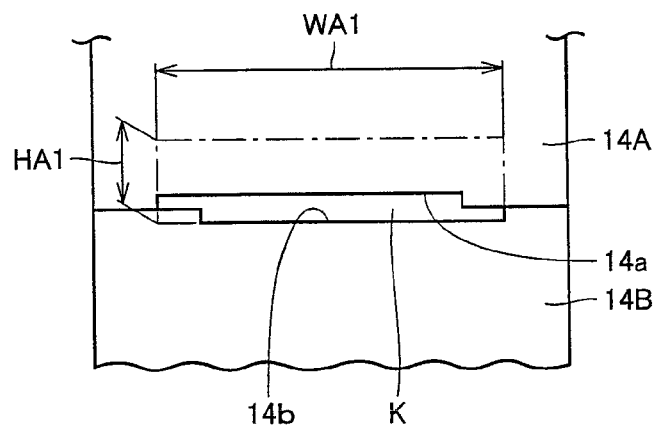
FIG. 3 is a cross sectional view showing the distance between a nip roller and a die roller in the manufacturing device shown in FIG. 2.

A gap between nip roller 14A and die roller 14B has a shape resembling the sectional shape of strip 12 as shown in FIG. 3. Here, "resembling" refers to being substantially similar to the sectional shape of strip 12. The similarity proportion is usually in a range of 0.50 to 0.90 in consideration of expansion, and gap K is smaller.

That is, die roller 14B is provided with recessed sections 14a, 14b on the circumferential surface of a straight cylindrical roll body. Recessed sections 14a, 14b correspond to strip 10. Therefore, strip 12 is molded by gap K formed by recessed sections 14a, 14b when nip roller 14A and die roller 14B are closed.

In this way, in manufacturing device 11, horizontally-long rectangular sheet 12A is formed first by extruder 13, and the shape of the die roller is transferred to the sheet on the condition that heat is not generated during die roll molding to mold strip 12. Then, strip 12 is detached from die roller 14B by a free roller 18A, and is processed into a final shape. It should be noted that multiple layers of sheets 12A could be stacked before being molded into strip 12. Accordingly, dimensional accuracy and stability are increased, and manufacturing efficiency can be improved in that, for example, a knife cutting operation for width adjustment usually required in calender molding becomes unnecessary.

The device for manufacturing the strip of the present invention can bond two types of sheets obtained by separate extruders to manufacture a strip. For example, in FIG. 2, a sheet 12B manufactured by another extruder (not shown) and above-mentioned sheet 12A can be passed through pair of free rollers 18A, 18B to manufacture strip 12 with sheets 12A and 12B bonded together with offsets on their opposite ends. Alternatively, a method for extruding two layers of sheets with a coextrusion device and continuously bonding the sheets to each other can be adopted for the strip.

It should be noted that, for that purpose, it is preferable to set an opening height (HA1) of extrusion port 16 of extrusion head 13B at 2 to 7 times the thickness of sheet 12A and to set an opening width (WA1) of extrusion port 16 at 0.7 to 1.0 times the width of sheet 12A.

If the opening height (HA1) exceeds 7 times the sheet thickness and the opening width (WA1) is less than 0.7 times the sheet width, the processing ratio in die roll molding will be excessively large, resulting in degraded quality and accuracy of strip 10. Particularly, accuracy in width will become unstable, which will require knife cutting to maintain width accuracy. If the opening height (HA1) is less than twice the sheet thickness, the sheet thickness at the time of extrusion will be thin in order to obtain strip 10 of not more than 1.0 mm. Then, extrusion pressure will be higher, resulting in unstable dimensions. On the other hand, if the opening width (WA1) exceeds the sheet width, the processing ratio will become too small to the contrary to cause sheet 12A to break, and dimensional stability will be deteriorated.

It should be noted that it is desirable to perform mold release processing on the die roller, the nip roller and the free rollers to be used in the molding step and the detaching step. Examples of a conventional technique that can be adopted for the mold release processing include a method for subjecting the roller surface to nitriding (radical nitriding, Kanuc process) to obtain a Cr—N coating (hardness Hv: 200 to 800; thickness: 25 to 500 μm), plating obtained by impregnating hard chromium with Teflon® (hardness Hv: 800 to 1000; thickness: 25 to 1000 μm), a diamond-like carbon (DLC) coating (hardness Hv: 2000 to 7000; thickness: 0.2 to 3.0 μm), and a Teflon® coating (hardness Hv: 100 to 500; thickness: 0.1 to 0.5 μm).

<Composition of Inner Layer and Outer Layer>

The strip of the present invention is formed of a layer stack including inner layer LB having a gas barrier function and outer layer LA having an adhesive function. Inner layer LB needs to contain a styrene-isobutylene-styrene block copolymer (SIBS). On the other hand, a thermoplastic elastomer, preferably a styrene-based thermoplastic elastomer composition is used for outer layer LA.

By manufacturing an inner liner using the strip of a layer stack with inner layer LB and outer layer LA of the above-described materials offset by a certain distance in the widthwise direction, surface unevenness can be reduced and made smooth. A pneumatic tire that eliminates collections of air and the like due to great unevenness and has excellent air shutoff property can be obtained.

<Inner Layer LB>

Inner layer LB contains a styrene-isobutylene-styrene triblock copolymer (SIBS). An isobutylene block in the SIBS provides a film made of the SIBS with excellent air permeability resistance. Therefore, when the SIBS is used for the inner liner, a pneumatic tire excellent in air permeability resistance can be obtained. Further, the molecular structure of the SIBS is completely saturated except aromatic molecule, so that the SIBS is restrained from being deteriorated and hardened and therefore has excellent durability. Therefore, when the SIBS is used for the inner liner, a pneumatic tire with excellent durability can be obtained.

Further, when manufacturing a pneumatic tire by applying such a film made of the SIBS to the inner liner, air permeability resistance can be secured. Therefore, it is not necessary to use a halogenated rubber, such as a halogenated butyl rubber, having been conventionally used to provide air permeability resistance and having a high specific gravity. Even if it is used, an amount of usage thereof can be reduced. Accordingly, weight reduction of tire can be achieved, thus achieving the effect of improving fuel efficiency.

The SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability unfavorably becomes bad. In order to further improve air permeability resistance and durability, the SIBS preferably contains the styrene component at a content of 10 mass % to 30 mass %, preferably, 14 mass % to 23 mass %.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form). The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization is possible between isobutylene and another vinyl compound and use of isobutylene and another compound for a vinyl compound allows for production of a polyisobutylene-based block copolymer.

The SIBS can be blended with the elastomer composition of the inner layer in a range of 5 mass % to 100 mass % as a polymer component. If the SIBS is less than 5 mass %, air shutoff property may be deteriorated. From a viewpoint of ensuring air shutoff property, the blending quantity of the SIBS in the inner layer is preferably in a range of 10 mass % to 80 mass %.

Further, the elastomer composition of the inner layer can contain a butyl rubber or a natural rubber (including an isoprene rubber) in a range of 60 mass % to 95 mass % as a polymer component. If the butyl rubber or the natural rubber (including an isoprene rubber) is less than the 60 mass %, viscosity will be high and extrusion workability will be deteriorated. Thickness reduction (weight reduction) may not be achieved. If the butyl rubber or the natural rubber exceeds 95 mass %, air shutoff property may be deteriorated. In order to increase unvulcanization adhesive property and vulcanization adhesive property of the elastomer composition, the butyl rubber or the natural rubber is preferably in a range of 70 mass % to 90 mass %.

It should be noted that the inner layer may be formed of a plurality of layers instead of a single layer. In this case, at least one layer needs to be formed of a layer containing the above-described SIBS. For example, of inner layers LB1, LB2 in FIG. 7, only inner layer LB1 on the side adjacent to the molding drum or the core body can be formed of a third layer containing a material other than the SIBS. In this case, the third layer is implemented by a material having excellent tackiness with the molding drum or the core body at the time of molding and excellent mold release property after vulcanization, as will be described later.

<Outer Layer LB>

Outer layer LB used for the strip of the present invention preferably contains a thermoplastic elastomer, in particular, among styrene-based thermoplastic elastomers, at least one of a styrene-isoprene-styrene triblock copolymer (hereinafter also referred to as "SIS") and a styrene-isobutylene diblock copolymer (hereinafter also referred to as "SIB").

The isoprene block of the styrene-isoprene-styrene triblock copolymer (SIS) is a soft segment. Hence, a polymer film made of the SIS is likely to adhere to a rubber component through vulcanization. Therefore, when a polymer film made of the SIS is used for the inner liner, a pneumatic tire excellent in durability can be obtained because the inner liner is excellent in adhesive property with the rubber layer of the carcass ply, for example.

The SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 mass % to 30 mass % in view of tackiness, adhesive property, and rubber elasticity.

In the present invention, it is preferable that in the SIS, the isoprene block has a degree of polymerization in a range of approximately 500 to 5,000 and the styrene block has a degree of polymerization in a range of approximately 50 to 1,500 in view of rubber elasticity and handling.

The SIS can be obtained through a general polymerization method for a vinyl-based compound, such as the living cationic polymerization method. The SIS layer can be obtained by forming the SIS into the form of a film by means of a general method for forming thermoplastic resin or thermoplastic elastomer into a film, such as extrusion molding or calender molding.

The isobutylene block of the styrene-isobutylene diblock copolymer (SIB) is a soft segment. Hence, a polymer film made of the SIB is likely to adhere to a rubber component through vulcanization. Therefore, when a polymer film made of the SIB is used for the inner liner, a pneumatic tire excellent in durability can be obtained because the inner liner is excellent in adhesive property with an adjacent rubber forming the carcass or an insulation, for example.

For the SIB, SIB having a linear molecular chain is preferably used in view of rubber elasticity and adhesive property. The molecular weight of the SIB is not particularly limited, but the SIB preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability unfavorably becomes bad.

The SIB preferably contains the styrene component at a content of 10 mass % to 35 mass %, in view of tackiness, adhesive property, and rubber elasticity. It is preferable that in the SIB, the isobutylene block has a degree of polymerization in a range of approximately 300 to 3,000 and the styrene block has a degree of polymerization in a range of approximately 10 to 1,500 in view of rubber elasticity and handling.

The SIB can be obtained through a general polymerization method for a vinyl-based compound, such as the living cationic polymerization method. For example, WO2005/033035 discloses a manufacturing method wherein the SIB is obtained by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

The SIB layer can be obtained by forming the SIB into the form of a film through a general method for forming thermoplastic resin or thermoplastic elastomer into a film, such as extrusion molding or calender molding.

<Third Layer>

In the present invention, the third layer arranged on the side in contact with the inner layer and adjacent to the core body or the molding drum is preferably implemented by a material that adheres to the core body or the molding drum during molding to facilitate molding and that is easily released from the mold after vulcanization.

For example, a styrene-based thermoplastic elastomer, such as a styrene-butadiene-styrene block copolymer (hereinafter also referred to as "SBS"), a styrene-ethylene/butene-styrene block copolymer (hereinafter also referred to as "SEBS"), or a styrene-butadiene/butylene-styrene block copolymer (hereinafter also referred to as "SBBS") is used.

Further, the styrene-based thermoplastic elastomer may have a molecular structure having an epoxy group. A usable example thereof is Epofriend A1020 (having a weight average molecular weight of 100,000 and an epoxy equivalent of 500) provided by Daicel Chemical Industries Ltd, i.e., an epoxy modified styrene-butadiene-styrene copolymer (epoxidized SBS).

<Method for Manufacturing Tire>

The method for manufacturing a pneumatic tire of the present invention includes a method for molding an inner liner, a step of molding a raw cover, and a step of vulcanizing the raw cover.

<Molding of Inner Liner>

Figure 13:
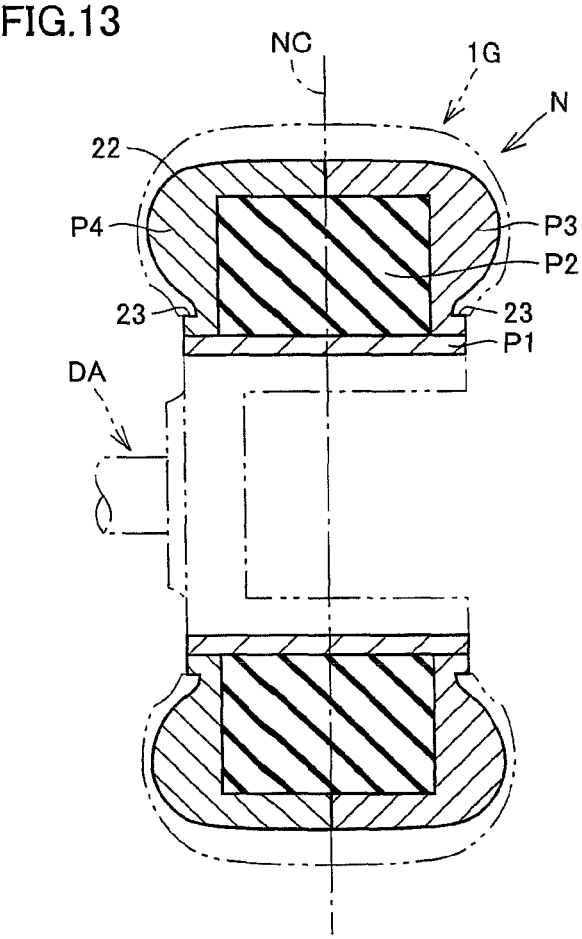
FIG. 13 shows a cross sectional shape of a core body used for molding of the tire of the present invention.
Figure 14:
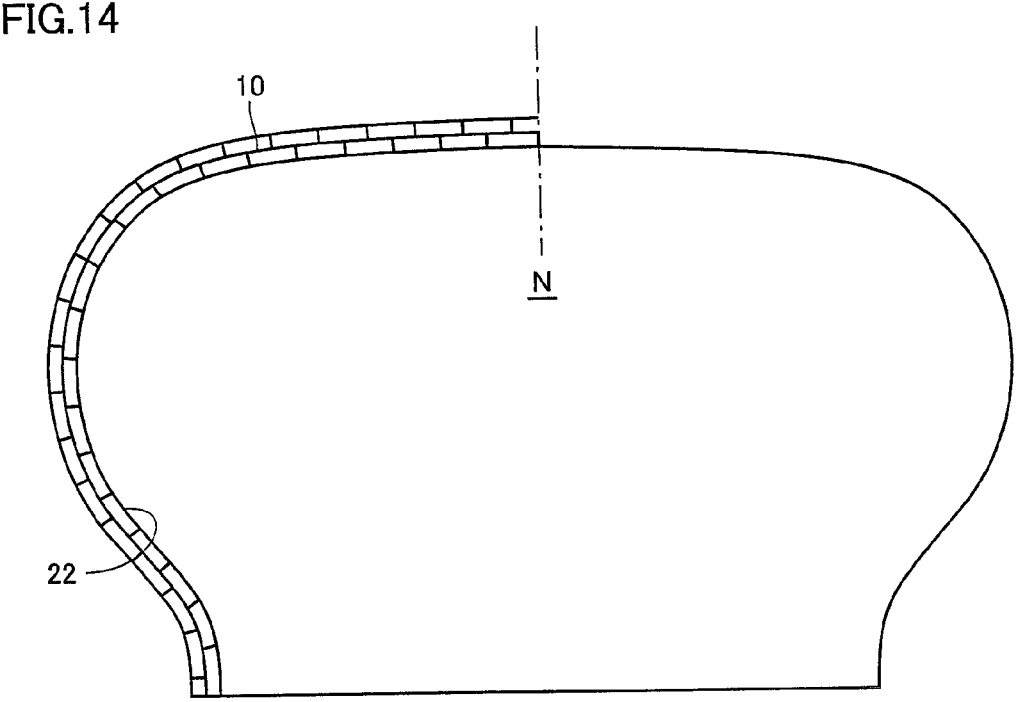
FIG. 14 is a schematic view showing a method of molding an inner liner using a strip on the outer circumferential surface of the core body.

Molding of the inner liner is performed in accordance with the molding method of a schematic view shown in FIG. 14 using core body N shown in FIG. 13. As shown in FIG. 14, the inner liner is formed by winding strip 10 on an outer circumferential surface 22 of core body N with its side edge offset in the circumferential direction. Here, strip 10 is of a ribbon shape having width WO of about 5 mm to 40 mm and thickness T0 of about 0.05 mm to 1.0 mm, for example. When winding, one end of strip 10 is affixed to outer circumferential surface 22 of core body N, and then core body N is rotated around a support shaft DA and strip 10 is moved with a predetermined pitch in the direction of rotation axis. Thereby, an inner liner 9G (FIG. 15) formed of strip 10 can be disposed in a partial or an entire area of outer circumferential surface 22 of core body N, as shown in FIG. 14. This method for molding a strip is called a strip winding method, which can be employed for forming a complicated three-dimensional shape. It should be noted that, for molding of the inner liner, a wide strip may be wound in a tread region, and the strip winding method may be adopted for the side portions on the opposite sides thereof.

Here, the opposite ends of strip 10 adjacent to each other when winding fit together, and a step difference is not substantially formed in the strip. On the other hand, an uneven step difference in the case of bonding by the molding method shown in FIG. 11 (molding with one layer of strip L1) and the molding method shown in FIG. 12 (molding with two layers of strip L1, L2) using a conventional strip having a rectangular cross sectional shape will be about twice the unevenness in the case of bonding by the molding method of the strip of the present invention.

In this way, the use of the strip of the present invention facilitates making the inner liner resemble a finished sectional shape required of the inner liner. In addition, a smooth contour can be obtained, and surface cracks can be prevented from occurring after vulcanization. On the other hand, the inner liner can be formed by approximately the same number of times of winding as in the case of a conventional strip of the same thickness, which can restrain production efficiency from being deteriorated and air from remaining.

Figure 15:
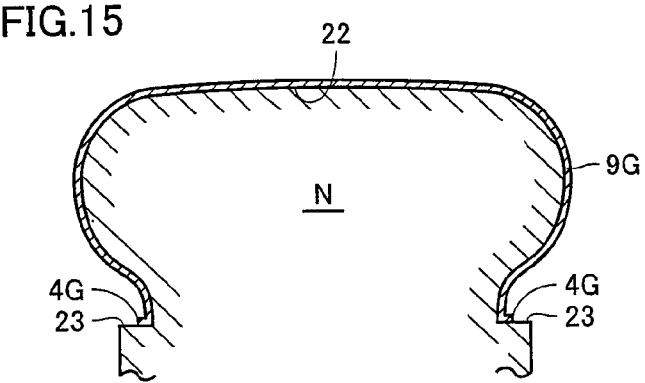
FIG. 15 is a schematic view of the inner liner molded on the outer circumferential surface of the core body.
Figure 16:
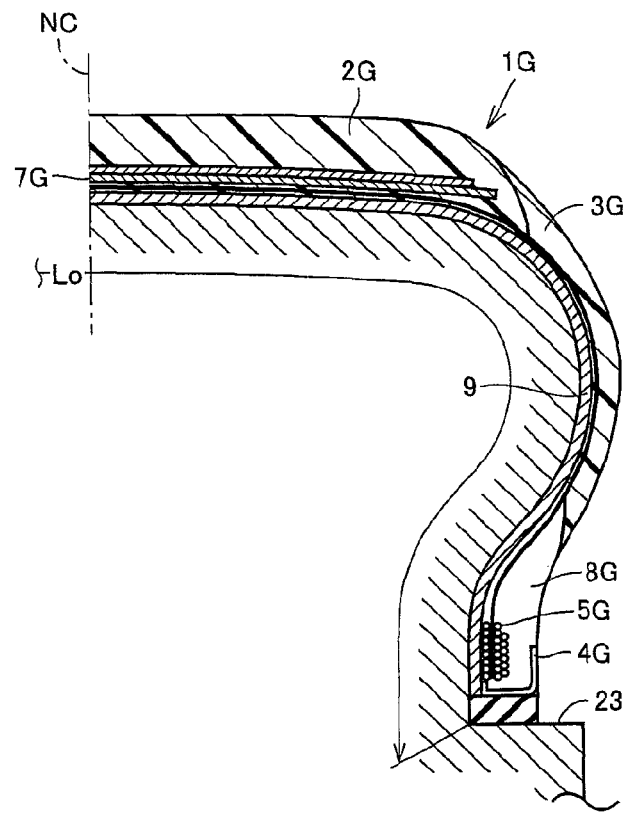
FIG. 16 is a cross sectional view of a molded unvulcanized tire.

It should be noted that, in the step of molding a raw cover 1G of FIG. 16 including molding of the inner liner, inner liner 9G is affixed to the outside of core body N, and the base of a clinch rubber 4G represents a rectangular cross sectional shape, for example, and is wound on a flange surface 23 into a ring shape, as shown in FIG. 15.

Core body N has three-dimensional outer circumferential surface 22 resembling the tire inner surface shape when 5% of internal pressure is applied to a product tire, and pair of flange surfaces 23 connected to the bead-side ends of this outer circumferential surface and extending outwardly in the axial direction. Here, the tire inner surface shape refers to the inner surface shape of a product tire. Moreover, "when 5% of internal pressure is applied to a product tire" shall refer to a state where pressure has been reduced from the normal internal pressure of the tire to 5% of the normal internal pressure. Generally, the sectional shape of a tire in this 5% internal pressure applied state is similar to the sectional shape of the tire in a vulcanization mold. Therefore, by making outer circumferential surface 22 of core body N resemble the inner surface shape of the tire when 5% of internal pressure is applied, strain which is elongation of a raw cover during vulcanization molding can be reduced, and tire uniformity can be improved.

In the present embodiment, FIG. 13 illustrates an assembly type core body N formed of a plurality of split pieces P1 to P4 that can be divided in the tire circumferential direction. Therefore, after forming raw cover 1G on the outside of core body N, respective split pieces P1 to P4 can be decomposed and taken out from raw cover 1G in a predetermined order. Core body N is not limited to the assembly type as in the present embodiment, but various types having rigidity such that its outer circumferential surface 22 is not substantially deformed during raw cover molding, such as an expansion type through the use of hydrostatic pressure, a contraction type, a drum type that can increase and decrease in diameter in the direction of the tire radius, can be adopted.

Core body N of the present embodiment is supported by support shaft DA in a cantilever and rotatable manner. It should be noted that, in such a case where assembly type core body N is vulcanized together with the raw cover, a metallic material, such as duralumin, for example, that can resist heat and pressure during the vulcanization is suitable. In such a case where core body N is taken out from the raw cover for vulcanization, a resin material excellent in handling or the like is suitable for core body N.

<Molding of Unvulcanized Tire>

Next, the step of forming a bead core on the outside of inner liner 9 in the bead region is performed. The bead core is formed by spirally winding a bead wire supplied continuously, for example, by several turns so as to be stacked from the base of the clinch rubber in the direction of the tire radius. Spiral winding of the bead wire is desirably carried out with, for example, a ring-shaped patch that can create a small clearance with the outer surface of inner liner 9 being mounted on flange surface 23.

Next, a toroidal carcass is molded, and then, as shown in FIG. 16, the step of arranging a bead core 5G and an apex 8G is performed. Moreover, clinch rubber 4G is arranged on the outside thereof in the tire axial direction. Furthermore, a belt layer 7G, a sidewall rubber 3G and a tread rubber 2G are arranged, respectively. Although each tire component can be implemented by winding an integral extrusion type component, one having a complicated cubic shape, such as sidewall rubber 3G, for example, can also be formed by the above-described strip winding method as appropriate. In this way, raw cover 1G is formed on the outside of core body N.

<Vulcanization of Tire>

Figure 17:
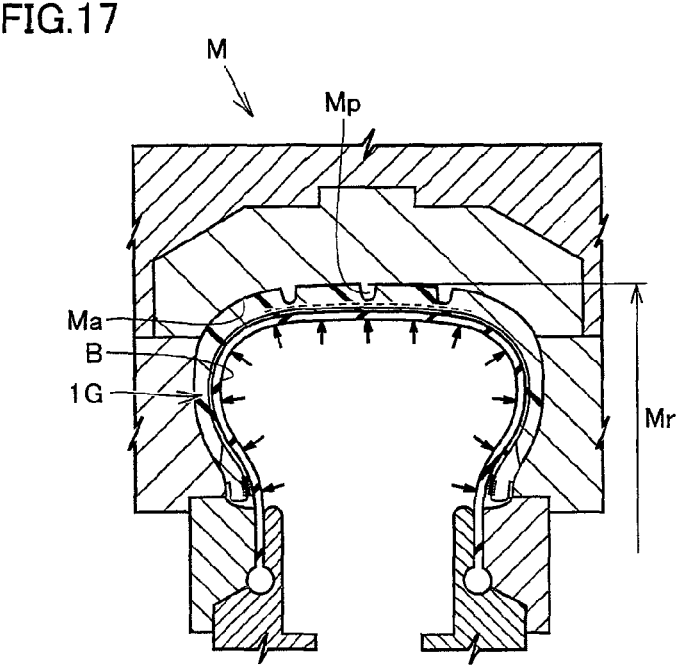
FIG. 17 is a cross sectional view of the unvulcanized tire placed in a vulcanization mold.

Next, in an embodiment of the present invention, core body N is removed from the inside of raw cover 1G, and then, as shown in FIG. 17, the vulcanization molding step of vulcanization molding raw cover 1G from which the core body has been removed with a vulcanization mold M is performed.

Above-mentioned vulcanization mold M has a molding surface Ma to come into contact with the outer surface of raw cover 1G to give it a predetermined shape. Vulcanization mold M is implemented by a widely known divided-type mold or the like. A bladder B that can expand and contract is disposed in the inside of raw cover 1G arranged in vulcanization mold M. Expanded bladder B comes into contact with the inside of raw cover 1G and strongly presses raw cover 1G against above-mentioned molding surface Ma, thereby ensuring vulcanization molding of a tire. By this action, a stretch in the radial direction and a radius stretch occur in raw cover 1G.

If each stretch is elongated, there are various defects described above. Therefore, the vulcanization molding step is carried out such that the stretch in the radial direction and/or the radius stretch of raw cover 1G present/presents a small value. This prevents the ends of the carcass cord from varying in the vulcanization molding step, so that a pneumatic tire uniformized with high accuracy in the tire circumferential direction is reliably manufactured. Moreover, the tension which acts upon the cord of the belt layer is controlled to be very small, which can reduce angle variations in the belt cord during vulcanization. Thus, the cord angle can be controlled with very high accuracy. Therefore, according to the manufacturing method of the present embodiment, a pneumatic tire further having excellent uniformity can be manufactured.

The stretch in the radial direction and/or the radius stretch of raw cover 1G at the time of vulcanization molding are/is preferably not more than 2.0%, more preferably not more than 1.5%, and particularly preferably not more than 1.0%. This stretch adjustment can be performed as appropriate by, for example, changing the relative relation between the shape of outer circumferential surface 22 of core body N and the shape of molding surface Ma of vulcanization mold M. That is, the stretch is elongated by making outer circumferential surface 22 of core body N relatively smaller than molding surface Ma of vulcanization mold M. On the other hand, the stretch can be made smaller by making outer circumferential surface 22 of core body N relatively larger.

The above-mentioned "radius stretch" can be calculated by the following formula from an inner diameter Ri at the position of a tire equator C of a resulting tire in the above-mentioned 5% internal pressure applied state and an outer diameter Ro at the position of an equator Nc of core body N.

Radius Stretch (%)={(Ri−Ro)×100}/Ro

It should be noted that above-mentioned inner diameter Ri can be approximately obtained by approximately reducing the distance twice the tread thickness in tire design dimensions from an inner diameter Mr of a section of mold surface Ma of vulcanization mold M where the tire equator is vulcanized (excluding a projection Mp for tread groove molding).

Moreover, "the stretch in the radial direction" can be calculated by the following formula from a path length (which is a so-called peripheral length measured along the contour; the same also applies below) Li in the radial direction from one bead toe to the other bead toe on the tire inside in the 5% internal pressure applied state of a resulting tire and a path length Lo (shown in FIG. 16) of the outer circumferential surface of core body N.

Stretch in the Radial Direction (%)={(Li−Lo)×100}/Lo

If the stretch in the radial direction exceeds 2.0%, for example, variations at the ends of the carcass cord, variations in cord change in belt layer 7, and the like are likely to increase. Then, sufficient improvement in uniformity cannot be expected. If the radius stretch exceeds 2.0%, arrangement disorder will be likely to occur in the belt cord and the like when the tread portion is strongly pressed against projection Mt for tread groove molding of vulcanization mold M.

The lower limit of stretch is 0%. That is, the tire sectional shape in the 5% internal pressure applied state of a resulting tire and raw cover 1G may have substantially the same shape, for example. This is because, in raw cover 1G molded according to the present invention, the tension of the carcass cord is uniformized on the tire circumference as compared with the case of experiencing the conventional expanding and deforming step.

However, the tension of the carcass cord in raw cover 1G is not completely uniformized on the tire circumference because of manufacturing variations of the carcass ply, errors at the time of affixing the carcass ply to core body N, and the like. In this sense, vulcanization is desirably performed while giving a much smaller stretch to raw cover 1G than in the conventional case to equalize nonuniform tension. Accordingly, even when there is a loosened carcass cord on the tire circumference in raw cover 1G, for example, the loosening can be reduced at the time of vulcanization. Inversely, for a carcass cord on which a high tension is acting, moderate sliding between the carcass cord and bead core 5, for example, is caused by the stretch, so that the tension in the carcass cord can finally be made more uniform. Furthermore, by applying a moderate tension to the belt cord or the like, the above-mentioned arrangement disorder can be suppressed.

From these viewpoints, it is desirable to determine the shape of outer circumferential surface 22 of core body N such that the radius stretch and/or the stretch in the radial direction of the raw cover during vulcanization are/is more preferably not less than 0.1%, still more preferably not less than 0.2%, and particularly preferably not less than 0.3%.

It should be noted that, as another embodiment, raw cover 1G can be vulcanized together with core body N. In this case, the steps of removing and transferring raw cover 1G and the like will become unnecessary, which can prevent deformation of raw cover 1G that would occur in such steps. A pneumatic tire further having excellent uniformity can be manufactured.

EXAMPLES

<Material of Strip>

The following thermoplastic elastomers (SIBS, SEBS, and SIS) were used for manufacturing of the strip of the present invention.

[SIBS]

"SIBSTAR 102T (Shore A hardness: 25; the content of the styrene component: 25 mass %; weight average molecular weight: 100,000)" provided by Kaneka Corporation was used.

[SEBS]

"KURATON G1657 (Shore A hardness: 47; the content of the styrene component: 13 mass %; weight average molecular weight: 200,000)" provided by Kraton Polymers was used.

[SIS]

D1161JP (the content of the styrene component: 15 mass %; weight average molecular weight: 150,000) provided by Kraton Polymers was used.

<Method for Manufacturing Inner Liner>

The SIBS, the SEBS and the SIS were implemented by commercially available pellets. They were blended by the following formulation with a Banbury mixer and a twin-screw extruder. Next, in order to extrusion mold a thermoplastic elastomer strip, the inner layer and outer layer LB were used to produce a ribbon-shaped sheet (thickness: 0.3 mm) of two-layer structure by coextrusion with a die extruder shown in FIGS. 2 and 3. The extrusion conditions are as follows:

Twin-screw extruder (screw diameter: φ50 mm; L/D: 30; cylinder temperature: 220° C.)

T-die extruder (screw diameter: φ80 mm; L/D: 50; die gap width: 500 mm; cylinder temperature: 220° C.)

This sheet was passed through nip roller 14A and die roller 14B to manufacture sheet 12A with a predetermined shape on the opposite ends. It should be noted that sheet 12A of multilayer structure is formed into a multilayer structure by coextruding thermoplastic elastomers using the above-mentioned extruder. Then, sheet 12A is bonded with second sheet 12B manufactured by another extruder passed through pair of free rollers 18A, 18B at a constant offset distance therebetween to manufacture strip 12. The specifications of the strip manufactured here are shown in Table 1.

The above-described strip was wound on the outer circumferential surface of the core body as shown in FIG. 14 to form a wide sheet-like inner liner with adjacent opposite ends of the strip forming junctions together.

<Manufacturing of Tire>

A pneumatic tire of tire size of 195/65R15 was prototyped using an inner liner obtained by molding a strip based on the specifications shown in Table 1 on a drum. It should be noted that press vulcanization was performed for 20 minutes at 170° C. Then, the tire was cooled for 3 minutes at 100° C. without removing the tire from the vulcanization mold, and then was removed from the vulcanization mold.

Each example is a strip in which the inner layer and the outer layer are offset. Each of Comparative Examples 1 to 3 is a strip without any offset. In each Comparative Example and Example, the core body has an outer circumference resembling the tire inner surface shape when 5% of internal pressure is applied to the tire. Furthermore, the radius stretch of each Comparative Example and Example is 1%, and the stretch in the radial direction is 1%.

<Method for Evaluating Tire Performance>

For the pneumatic tires of the Examples and the Comparative Examples shown in Table 1, performance evaluation was conducted by the following methods.

<Air-In Performance>

The inside of a vulcanized tire was checked by appearance and evaluated as follows:

A: In appearance, per tire, the number of air bubbles with a diameter not more than 5 mm was 0, and the number of air bubbles with a diameter exceeding 5 mm was 0.

B: In appearance, per tire, the number of air bubbles with a diameter not more than 5 mm was 1 to 3, and the number of air bubbles with a diameter exceeding 5 mm was 0.

C: In appearance, per tire, the number of air bubbles with a diameter not more than 5 mm was 4 or more, and the number of air bubbles with a diameter exceeding 5 mm was 1 or more.

TABLE 1

Figure 11:
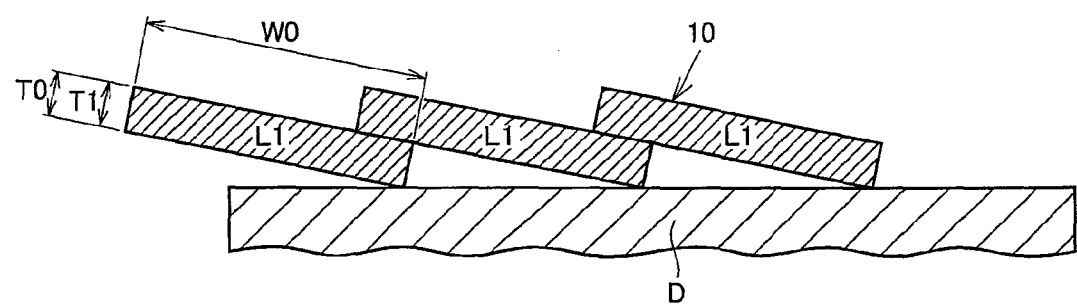
FIG. 11 is a schematic cross sectional view of a conventional strip.
Figure 12:
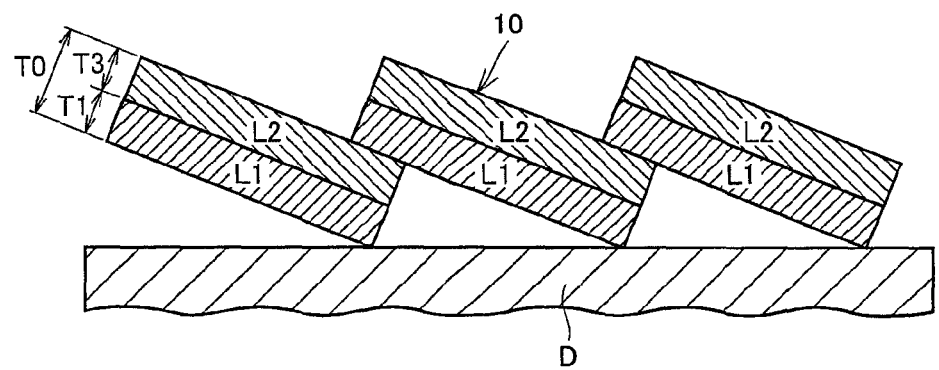
FIG. 12 is a schematic cross sectional view of a conventional strip.

|  |  |  | Comparative Example | | | Example | | | | | | | |
|---|---|---|---|---|---|---|---|---|---|---|---|---|---|
|  |  |  | 1 | 2 | 3 | 1 | 2 | 3 | 4 | 5 | 6 | 7 | 8 |
| Shape of Strip |  |  | FIG. 11 | FIG. 11 | FIG. 12 | FIG. 4 | FIG. 4 | FIG. 5 | FIG. 5 | FIG. 6 | FIG. 6 | FIG. 7 | FIG. 7 |
| Inner Layer | First Layer (LB1) | Material | SIBS | SIBS | SIBS | SIBS | SIBS | SIBS | SIBS | SIBS | SIBS | SEBS | SEBS |
|  |  | Thickness (TB1) mm | 0.6 | 0.1 | 0.5 | 0.1 | 0.5 | 0.25 | 0.10 | 0.10 | 0.50 | 0.05 | 0.10 |
|  | Second Layer (LB2) | Material | — | — | — | — | — | — | — | SIS | SIS | SIBS | SIBS |
|  |  | Thickness (TB2) mm | — | — | — | — | — | — | — | 0.05 | 0.05 | 0.10 | 0.20 |
| Outer Layer | First Layer (LA1) | Material | — | — | SIS | SIS | SIS | SIBS | SIBS | SIS | SIS | SIBS | SIBS |
|  |  | Thickness (TA1) mm | — | — | 0.10 | 0.05 | 0.10 | 0.25 | 0.10 | 0.05 | 0.05 | 0.10 | 0.20 |
|  | Second Layer (LA2) | Material | — | — | — | — | — | SIS | SIS | — | — | SIS | SIS |
|  |  | Thickness (TA2) mm | — | — | — | — | — | 0.05 | 0.40 | — | — | 0.05 | 0.10 |
| Offset Distance L (mm) |  |  | — | — | 0 | 0.5 | 20.0 | 0.5 | 20.0 | 0.5 | 20.0 | 0.5 | 20.0 |
| Performance Evaluation | Air-in Performance |  | C | C | B | A | A | A | A | A | A | A | A |
|  | Uniformity (LFV) |  | 100 | 99 | 98 | 105 | 110 | 106 | 112 | 109 | 115 | 113 | 118 |
|  | Uniformity (RFV) |  | 100 | 98 | 98 | 104 | 110 | 105 | 111 | 108 | 114 | 113 | 117 |
|  | Crack Growth |  | 100 | 98 | 98 | 105 | 108 | 106 | 105 | 105 | 108 | 106 | 108 |
|  | Static Air Pressure Decreasing Ratio (%/Month) |  | 2.7 | 2.9 | 2.7 | 2.6 | 2.5 | 2.2 | 2.4 | 1.7 | 1.9 | 1.9 | 1.7 |
|  | Total Judgment |  | B | B | B | A | A | A | A | A | A | A | A |

(Note 1)
In Table 1, "SIBS" is a material containing the SIBS by 100 mass %.

(Note 2)
In Table 1, "SEBS" is a material containing the SEBS by 100 mass %.

(Note 3)
In Table 1, "SIS" is a material containing the SIS by 100 mass %.

<Uniformity (LFV, RFV)>

In conformity with the uniformity test conditions of JASOC607:2000, the lateral force variation (LFV) and the radial force variation (RFV) were measured. In each result, an average value (N) of 20 tires was calculated, and a relative value was indicated in an index with Comparative Example 1 being regarded as 100. As the index is larger, the uniformity is more excellent.

The Uniformity Index=(Uniformity of Comparative Example 1/Uniformity of Each Example)×100

<Flection Crack Growth Test>

In endurance traveling test of trial tire, crack and detachment state of the inner liner was evaluated. Each trial tire was assembled to a JIS specification rim 15×6JJ. The tire internal pressure was set at 150 KPa, which was lower internal pressure than normal internal pressure. The load was set at 600 kg. The speed was set at 100 km/h. The travel distance was set at 20,000 km. Inside of the tire was observed to measure the number of cracks and detachments, which is indicated by a relative value with reference to Comparative Example 1.

The Index of the Crack Growth Resistance=(the Number of Cracks in Comparative Example 1/the Number of Cracks in Each Example)×100

<Static Air Pressure Decreasing Ratio>

Each trial tire was assembled to a JIS specification rim 15×6JJ, and air was introduced thereinto at an initial air pressure of 300 kPa. Then, the trial tire was left for 90 days at a room temperature. Then, decreasing ratio of air pressure was calculated after 1 month. As the numerical value thereof is smaller, the air pressure was less decreased, which is preferable.

<Total Judgment>

A tire that satisfied all of the following conditions (a) to (d) was rated A as a total judgment:
(a) Air-in performance rated A;
(b) Uniformity not less than 100;
(c) Flection crack growth not less than 100; and
(d) Static air pressure decreasing ratio not more than 2.6

A tire that satisfied the following conditions in any one of (a) to (d) below was rated B or C as a total judgment. When a plurality of judgments applied, one of lower evaluation was adopted.
(a) Air-in performance rated B or C;
(b) Uniformity less than 100;
(c) Flection crack growth less than 100; and
(d) Static air pressure decreasing ratio more than 2.6.

<Tire Evaluation Results>

Each of Comparative Examples 1 to 3 is an example of strip without any offset. Each of Examples 1 to 8 is an example of strip in which the inner layer and the outer layer are at a constant offset. It is recognized that Examples of the present invention excels the Comparative Examples in all of air-in performance, flection crack growth and static air pressure decreasing ratio.

INDUSTRIAL APPLICABILITY

The inner liner including the strip of the present invention can be applied to a method for manufacturing various pneumatic tires such as a pneumatic tire for passenger car, a pneumatic tire for track/bus, and a pneumatic tire for heavy vehicle.

REFERENCE SIGNS LIST

1: pneumatic tire; 2: tread portion; 3: sidewall portion; 4: bead portion; 5: bead core; 6: carcass ply; 7: belt layer; 8: bead apex; 9: inner liner; 10: strip; 11: strip manufacturing device; 12: sheet; 13: extruder; 14A, 14B: die roller; 15: screw shaft; 16: extrusion port; 17: mouthpiece; 18A, 18B: free roller.

The invention claimed is:

1. A strip to be wound on an outer circumferential surface of one of a tire molding drum and a core body to form an inner liner,
   the strip having an inner layer disposed inwardly in a tire and an outer layer disposed outwardly in the tire, the inner layer and the outer layer being bonded to each other with their ends offset by 0.5 mm to 30 mm in a widthwise direction so as to form ear portions at the ends,
   at least one layer of said inner layer is formed of an elastomer composition containing a styrene-isobutylene-styrene block copolymer, and
   at least one layer of said outer layer is formed of a thermoplastic elastomer composition consisting essentially of one of a styrene-isoprene-styrene block copolymer and a styrene-isobutylene block copolymer.

2. The strip according to claim 1, wherein said strip has a width (W0) of 5 mm to 40 mm and a thickness (T0) of 0.02 mm to 1.0 mm.

3. A method for manufacturing the strip as defined in claim 1, comprising the steps of:
   (a) extruding a thermoplastic elastomer by an extruder having an extruder main body and an extrusion head to form a sheet;
   (b) passing the sheet between a die roller and a nip roller to transfer a shape of said die roller on said sheet to mold the inner layer and the outer layer of design shape respectively;
   (c) detaching each of said inner layer and said outer layer from said die roller; and
   (d) bonding said inner layer and said outer layer with their ends in a longitudinal direction offset by 0.5 mm to 30 mm to form the strip.

4. A method for manufacturing a pneumatic tire, wherein the strip as defined in claim 1 is wound along a circumferential direction of a molding drum with side edges of the strip offset, thereby molding the inner liner.

5. A method for manufacturing a pneumatic tire, wherein the strip as defined in claim 1 is wound along a circumferential direction of the core body with side edges of the strip offset, thereby molding the inner liner having a shape close to a finished sectional shape thereof.

6. The method for manufacturing a pneumatic tire according to claim 5, wherein said core body has an outer circumferential surface resembling a tire inner surface shape when 5% of internal pressure is applied.

7. The method for manufacturing a pneumatic tire according to claim 5, wherein said core body has an outer circumferential surface smaller than a tire inner surface shape when 5% of internal pressure is applied.

8. The method for manufacturing a pneumatic tire according to claim 5, comprising:
   the step of forming an unvulcanized tire molded using said strip, on the outside of said core body; and
   the step of vulcanizing of inputting the unvulcanized tire having removed from said core body into a vulcanization mold for vulcanization molding.

9. The method for manufacturing a pneumatic tire according to claim 8, wherein in said step of vulcanizing, the unvulcanized tire is vulcanized with 0.1% to 2.0% of a radius stretch by expansion of a bladder disposed on an inner side of the unvulcanized tire.

10. The method for manufacturing a pneumatic tire according to claim 8, wherein in said step of vulcanizing, the unvulcanized tire is vulcanized with 0.1% to 2.0% of a stretch in a radial direction by expansion of a bladder disposed on an inner side of the unvulcanized tire.

11. The method for manufacturing a pneumatic tire according to claim 5, comprising the steps of:
   forming an unvulcanized tire molded using said strip on the outside of said core body; and
   inputting said unvulcanized tire and said core body together into a vulcanization mold and heating said vulcanization mold and said core body, thereby vulcanizing the tire.

\* \* \* \* \*